United States Patent
Carey

(10) Patent No.: US 10,349,012 B2
(45) Date of Patent: Jul. 9, 2019

(54) SELF-HEALING VIDEO SURVEILLANCE SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 292 days.

(21) Appl. No.: 15/431,419

(22) Filed: Feb. 13, 2017

(65) Prior Publication Data
US 2017/0155874 A1 Jun. 1, 2017

Related U.S. Application Data

(63) Continuation of application No. 14/080,178, filed on Nov. 14, 2013, now Pat. No. 9,571,800.

(Continued)

(51) Int. Cl.
| | |
|---|---|
| *H04N 5/77* | (2006.01) |
| *G06F 21/55* | (2013.01) |
| *H04N 21/2347* | (2011.01) |
| *H04N 21/2743* | (2011.01) |
| *H04N 7/18* | (2006.01) |

(52) U.S. Cl.
CPC ............. *H04N 7/181* (2013.01); *G06F 21/55* (2013.01); *H04N 5/77* (2013.01); *H04N 21/2347* (2013.01); *H04N 21/2743* (2013.01)

(58) Field of Classification Search
CPC ...... H04N 7/181; H04N 5/77; H04N 21/2347; G06F 21/55
See application file for complete search history.

(56) References Cited

U.S. PATENT DOCUMENTS

| 6,975,346 B2 | 12/2005 | Kumhyr |
|---|---|---|
| 7,308,487 B1 | 12/2007 | Dansie et al. |

(Continued)

FOREIGN PATENT DOCUMENTS

| RU | 83675 U1 | 6/2009 |
|---|---|---|
| RU | 2459267 C2 | 8/2012 |

(Continued)

OTHER PUBLICATIONS

Russian Office Action dated Feb. 15, 2017 in corresponding Russian Patent Application No. 2015138956 with English-translation, 13 pages.

(Continued)

*Primary Examiner* — Thai Q Tran
*Assistant Examiner* — Jose M Mesa
(74) *Attorney, Agent, or Firm* — Carter, DeLuca & Farrell LLP

(57) ABSTRACT

A self-healing video surveillance system is described. The self-healing video surveillance system includes one or more surveillance cameras that are configured to store configuration data of a network video recorder in operable communication with the surveillance cameras. The network video recorder includes configuration data, and a module configured to store the configuration data on the surveillance cameras and/or retrieve configuration data stored on the surveillance cameras. A new network video recorder introduced into the network retrieves the stored configuration data to self-configure with minimal or no human interaction. In embodiments, configuration data is distributed among a plurality of surveillance cameras, and may be stored in encrypted format.

20 Claims, 3 Drawing Sheets

Related U.S. Application Data

(60) Provisional application No. 61/798,940, filed on Mar. 15, 2013.

(56) References Cited

U.S. PATENT DOCUMENTS

| | | | |
|---|---|---|---|
| 2004/0161133 | A1 | 8/2004 | Elazar et al. |
| 2007/0003141 | A1 | 1/2007 | Rittscher et al. |
| 2007/0057049 | A9 | 3/2007 | Kundu et al. |
| 2007/0127774 | A1 | 6/2007 | Zhang et al. |
| 2007/0254634 | A1 | 11/2007 | Costa-Requena et al. |
| 2007/0297607 | A1 | 12/2007 | Ogura et al. |
| 2008/0018738 | A1 | 1/2008 | Lipton et al. |
| 2008/0106599 | A1 | 5/2008 | Liu et al. |
| 2008/0263610 | A1 | 10/2008 | Murray et al. |
| 2009/0222388 | A1 | 9/2009 | Hua et al. |
| 2009/0222466 | A1 | 9/2009 | Allison et al. |
| 2010/0026802 | A1 | 2/2010 | Titus et al. |
| 2010/0097473 | A1* | 4/2010 | Park .................. H04N 5/23203 348/159 |
| 2010/0135643 | A1 | 6/2010 | Fleming |
| 2010/0182428 | A1* | 7/2010 | Lu ..................... H04N 7/181 348/143 |
| 2010/0321183 | A1 | 12/2010 | Donovan et al. |
| 2011/0219385 | A1 | 9/2011 | Jacobson et al. |
| 2012/0008836 | A1 | 1/2012 | Bobbitt et al. |
| 2012/0198221 | A1 | 8/2012 | Tukol et al. |
| 2012/0311564 | A1 | 12/2012 | Khalid |
| 2012/0324061 | A1 | 12/2012 | Parsons et al. |

FOREIGN PATENT DOCUMENTS

| | | |
|---|---|---|
| WO | 2007/139994 A2 | 12/2007 |
| WO | 2012/102909 A1 | 8/2012 |
| WO | 2012/170551 A2 | 12/2012 |
| WO | 2013/030296 A1 | 3/2013 |
| WO | 2014155958 A1 | 10/2014 |

OTHER PUBLICATIONS

Canadian Office Action issued in Appl. No. 2,965,917 dated Mar. 27, 2018 (5 pages).
Daniel A. Vaquero et al., "Attribute-Based People Search," Chapter 14, Intellegent Video Surveillance: Systems and Technology, published Dec. 7, 2009, pp. 387-405.
International Preliminary Report on Patentability for corresponding Application No. PCT/US2013/070067, dated Sep. 15, 2015.
Extended European Search Report for application No. EP 14 76 4242 dated Aug. 26, 2015, 9 pages.
Anonymous: "Configuration Backup Restore", Jun. 30, 2010 (Jun. 30, 2010), XP055127450, retrived from the Internet: URL: https://downloads.avaya.com/css/P8/documents/1 00088380 [retrieved on Aug. 7, 2014].
International Search Report for corresponding PCT Application No. PCT/US2013/070067, dated Jul. 21, 2014, 4 pages.
European Office Action dated Jul. 12, 2018 issued in corresponding EP Appln. No. 13859615.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
Song et al., "Real-Time Monitoring for Crowd Counting Using Video Surveillance and GIS," IEEE, 2nd International Conference on Remote Sensing, Environment and Transportation Engineering (RSETE), Jun. 1, 2012, 4 pages.
Canadian Office Action dated Oct. 16, 2017 in Appl. No. CA 2,906,353 (4 pages).
Canadian Office Action dated Mar. 1, 2019 issued in corresponding CA Appln. No. 2,965,917.

\* cited by examiner

SELF-HEALING VIDEO SURVEILLANCE SYSTEM

CROSS-REFERENCE TO RELATED APPLICATIONS

This application is a continuation of U.S. patent application Ser. No. 14/080,178, filed on Nov. 14, 2013, which claims the benefit of, and priority to, U.S. Provisional Patent Application Ser. No. 61/798,940, filed on Mar. 15, 2013, the entireties of each of which are hereby incorporated by reference herein for all purposes.

BACKGROUND

1. Technical Field

The present disclosure is directed to systems and methods for the automated backup and recovery of digital data, and, in particular, to systems and methods for storing server configuration information on one or more remote devices and for automatically locating, identifying, and retrieving the stored data for use by a replacement server.

2. Background of Related Art

Many modern enterprises depend upon information technology to achieve mission objectives, to manage administrative tasks, to build and maintain a competitive advantage in the marketplace, to ensure compliance, and to enhance security. As a result, computing devices of all types are in common business use, such as desktop computers, laptop computers, mobile devices such as tablets and smart phones, and server computers. In addition, a wide range of specialized devices are in common use, such as printers, scanners, still and video cameras, biometric devices (hand, retina, fingerprint scanners) and automated identification devices (barcode scanners and RFID devices).

Servers play a vital role in an organization's information infrastructure, because they provide the fundamental storage, processing, and communication functions necessary for the operation of the other computing devices in the enterprise. As a result, the continuous, uninterrupted availability of servers is a much-desired goal of the system administrator. This goal, however, is elusive, because failures inevitably occur due to hardware faults, software errors, or power failures. Techniques have been devised which reduce the occurrence and/or mitigate the effects of a server crash, such as the use of redundant or standby servers, server clustering, cloud computing, virtual server pools, and so forth. However, these techniques may have drawbacks, such as high cost, requiring a high level of skill to maintain, or are overkill for many small businesses. Moreover, in many instances a server may need to be replaced due to an irreparable failure, upgrade, or even theft of equipment.

Typically, when a server is deployed, the operating system and application software is installed onto the server prior to delivery to the end-user. However, before the server is placed into service, a number of configuration settings which tailors the operation of the server to its environment must be entered. Such configuration settings include network settings, user accounts, user data, application data, authentication and access control data, and information relating to other devices with which the server must communicate. Manual entry of configuration data is slow and error-prone, and relies upon the accuracy and completeness of the last recorded set of configuration parameters. Often no such record exists, because a backup was never performed, the backup device was lost or stolen, or configuration notes were lost, illegible, or incorrect.

SUMMARY

Disclosed is a self-configuring computer deployment system. The disclosed system, and related methods, enables a new computer, and, in particular, a server computer, that is deployed into an existing environment to rapidly and conveniently self-configure or "self-heal" using configuration data that was previously stored in other devices residing on the network, such as an IP-based digital camera. In this manner, the deployment of replacement servers may be accomplished more quickly, with less effort, and with less chance for error.

In accordance with one aspect of the present disclosure, a self-configuring video surveillance system is described. The self-configuring video surveillance system includes one or more surveillance cameras that are configured to store configuration data of a network video recorder, and a network video recorder in operable communication with the surveillance cameras. The network video recorder includes configuration data, and a module configured to store the configuration data on the surveillance cameras, and/or retrieve configuration data stored in the surveillance cameras. In some embodiments, the network video recorder includes the ability to record video from one or more digital cameras (e.g., IP-based) and may include the ability to record video from one or more analog cameras (e.g., NTSC, PAL, RGB, composite video, component video, etc.).

In some embodiments, the surveillance cameras may include an IP-based video camera. In other embodiments, the self-configuring video surveillance system may include a plurality of surveillance cameras that are configured to store configuration data of a network video recorder. The module may be configured to store the configuration data among two or more of the plurality of surveillance cameras such that each of the two or more of the plurality of surveillance cameras stores a portion of the configuration data that is less than all of the configuration data.

In still other embodiments, the configuration data is stored in one or more surveillance cameras in encrypted format. In some embodiments, the configuration data includes eXtensible Markup Language (XML) data. In yet other embodiments, the module is configured to validate the integrity of the configuration data retrieved from the surveillance cameras.

In another aspect of the present disclosure, a method of configuring a computing device in a network of remote devices is disclosed. In some embodiments, the method includes the step of periodically storing, in one or more remote devices of the network of remote devices, a configuration data archive relating to an existing computing device. In other embodiments, the existing computing device may include a network video recorder. In still other embodiments, the remote device(s) may include one or more IP-based video cameras having the ability to store user data, e.g., configuration data.

The method may also include the step of placing a computing device to be configured into operable communication with the network of remote devices. In one embodiment, this step may include deploying a new or replacement network video recorder, with no configuration data, into an established site. In other embodiments, this step may include establishing a network link between the new or replacement network video recorder and the established network of IP-based cameras. The method may include the step of determining, by the computing device to be configured, whether the remote devices of the network of remote devices has stored therein a configuration data archive and, in response to a determination that the remote devices of the network of remote devices has stored therein a configuration data archive, transferring data from the configuration data archive to the computing device to be configured.

In some embodiments, the new network video recorder will attempt to locate and identify whether any IP-based video cameras are reachable within the network (e.g., within the local subnet) to which the network video recorder is connected. When such a camera is identified, a communications channel is established between the camera and the network video recorder, and any configuration data that is stored in the camera is downloaded to the network video recorder.

The method may also include the step of configuring the computing device to be configured with data from the configuration data archive. In some embodiments, this step includes applying the downloaded configuration data to the corresponding configuration settings of the network video recorder. Such configuration data settings may include, without limitation, network configuration of one or more network interfaces of the network video recorder, site data, username and password data, operational data associated with the site's IP cameras (including IP address, camera name, resolution, color depth, bitrate, framerate, compression and encoding scheme, location, position, height, angle of view, focal length, etc.), operational data associated with the site's analog cameras, if any (including camera name, input port, resolution, framerate, etc.), scheduling data, triggers, auxiliary inputs, customizations, and so forth.

In yet another aspect, disclosed is a method of configuring a computing device in a network of remote devices. In some embodiments, the disclosed method includes transferring the configuration data of an existing computing device to a plurality of remote devices, wherein the configuration data is apportioned among two or more of the plurality of remote devices such that each of the two or more of the plurality of remote devices stores a portion of the configuration data that is less than all of the configuration data. In this manner, a level of data security is achieved by ensuring no one IP camera includes all of the configuration data of the network video recorder. In some embodiments, the configuration data is redundantly stored among the two or more of the plurality of remote devices, such that if one or more of the two or more of the plurality of remote devices becomes unavailable, e.g., through theft or catastrophic failure, a complete copy of the distributed configuration data may be reconstructed from the remaining remote devices.

The method may also include the steps of placing a computing device to be configured into operable communication with the network of remote devices, identifying, by the computing device to be configured, which of the two or more of the plurality of remote devices has stored therein configuration data, transferring the stored configuration data portions from each of the identified remote devices to the computing device to be configured, reassembling the configuration data from the configuration data portions, and configuring the computing device to be configured using the configuration data.

In some embodiments, reassembling the configuration data from the configuration data portions includes confirming that the configuration data is complete. In other embodiments, the configuration data is stored on the remote device in an encrypted format.

In another aspect, the present disclosure is directed to a method of configuring a computing device in a network of one or more remote devices. The method includes the steps of storing, in a remote device, a configuration data archive relating to an existing computing device, determining, by a computing device to be configured, whether the remote device has stored therein a configuration data archive. In response to a determination that the remote device has stored therein a configuration data archive, data is transferred from the configuration data archive to the computing device to be configured.

In some embodiments, the storing step is performed in accordance with a schedule. The schedule may include regular intervals (hourly, daily, weekly etc.) and/or may include arbitrary times, user-specified times. In some embodiments, the storing step is performed in response to an input or an event, such as, without limitation, an intrusion detection (hack-in detection, virus or malware detection, premises burglary alarm, etc.) and/or malfunction detection (software crash, hardware error, exceeding a S.M.A.R.T. hard drive error threshold, power failure, UPS battery alarm, etc.). In other embodiments, the configuration data is stored on the remote device in an encrypted format. In still other embodiments, the computing device to be configured includes a network video recorder. In yet other embodiments, the method includes the step of placing the computing device to be configured into operable communication with the network of the one or more remote devices. In yet another embodiment, the method includes configuring the computing device to be configured with data from the configuration data archive.

In still another aspect, the present disclosure is directed to a method of configuring a computing device in a network of remote devices that includes transferring the configuration data of an existing computing device to a plurality of remote devices, wherein the configuration data is apportioned among two or more of the plurality of remote devices such that each of the two or more of the plurality of remote devices stores a portion of the configuration data that is less than all of the configuration data and identifying, by a computing device to be configured, which of the two or more of the plurality of remote devices has stored therein configuration data. The stored configuration data portions from each of the identified remote devices is transferred to the computing device to be configured. In embodiments, the disclosed method includes the step of reassembling the configuration data from the configuration data portions. In other embodiments, reassembling the configuration data from the configuration data portions includes confirming that the configuration data is complete. In yet other embodiments, the method includes the step of configuring the computing device to be configured using the configuration data. In still other embodiments, the configuration data is stored on the remote device in an encrypted format. The transferring step may be performed in accordance with a schedule. The computing device may be configured to include a network video recorder. The method may include the step of placing the computing device to be configured into operable communication with the network of remote devices.

In still another aspect, the present disclosure is directed to a self-healing video surveillance system having one or more surveillance cameras configured to store configuration data of a network video recorder in operable communication with the surveillance cameras. The network video recorder includes configuration data, and a module configured to store the configuration data on the surveillance cameras and retrieve configuration data stored in the surveillance cameras. In embodiments, the surveillance cameras include an IP-based video camera. The module may be configured to store the configuration data in two or more remote devices such that each of the remote devices stores a portion of the configuration data that is less than all of the configuration data. In embodiments, the configuration data stored in the surveillance cameras is encrypted. In other embodiments, the configuration data includes eXtensible Markup Language data. The module may be configured to validate the integrity of the configuration data retrieved from the surveillance cameras.

In another aspect, the present disclosure is directed to a self-healing computer having one or more processors configured to perform the operation of storing, in a remote device, a configuration data archive relating to an existing computing device and determining, by a computing device to be configured, whether the remote device has stored therein a configuration data archive. In response to a determination that the remote device has stored therein a configuration data archive, data from the configuration data archive is transferred to the computing device to be configured. In embodiments, storing is performed in accordance with a schedule. The configuration data may be stored on the remote device in an encrypted format. The computing device to be configured may include a network video recorder.

In still another aspect, the present disclosure is directed to a self-healing video surveillance system having a plurality of surveillance cameras configured to store configuration data of a network video recorder. The network video recorder is in operable communication with the at least one surveillance camera, and includes configuration data a module configured to perform at least one of storing the configuration data on the at least one surveillance camera and retrieving configuration data stored in the at least one surveillance camera. In some embodiments, the module is configured to store redundant configuration data among a subset of the plurality surveillance cameras such that the subset of the plurality surveillance cameras stores the entirety of configuration data of the network video recorder.

In another aspect, the present disclosure is directed to non-transitory computer-readable media including software for configuring a computing device in a network including one or more remote devices, which software, when executed by a computer system, causes the computer system to perform the operations of storing, in one or more remote devices, a configuration data archive relating to an existing computing device and determining, by a computing device to be configured, whether the remote device(s) has stored therein a configuration data archive. In response to a determination that the remote device(s) has stored therein a configuration data archive, the software transfers data from the configuration data archive to the computing device to be configured.

In still another aspect, the present disclosure is directed to non-transitory computer-readable media including software for configuring a computing device in a network of remote devices, which software, when executed by a computer system, causes the computer system to perform the operations of transferring configuration data of an existing computing device to a plurality of remote devices, wherein the configuration data is apportioned among two or more of the plurality of remote devices such that each of the two or more of the plurality of remote devices stores a portion of the configuration data that is less than all of the configuration data. A computing device to be configured identifies which of the two or more of the plurality of remote devices has stored therein configuration data, and the stored configuration data portions are transferred from each of the identified remote devices to the computing device to be configured.

BRIEF DESCRIPTION OF THE DRAWINGS

Example embodiments in accordance with the present disclosure are described herein with reference to the drawings wherein.

DETAILED DESCRIPTION

Figure 1:
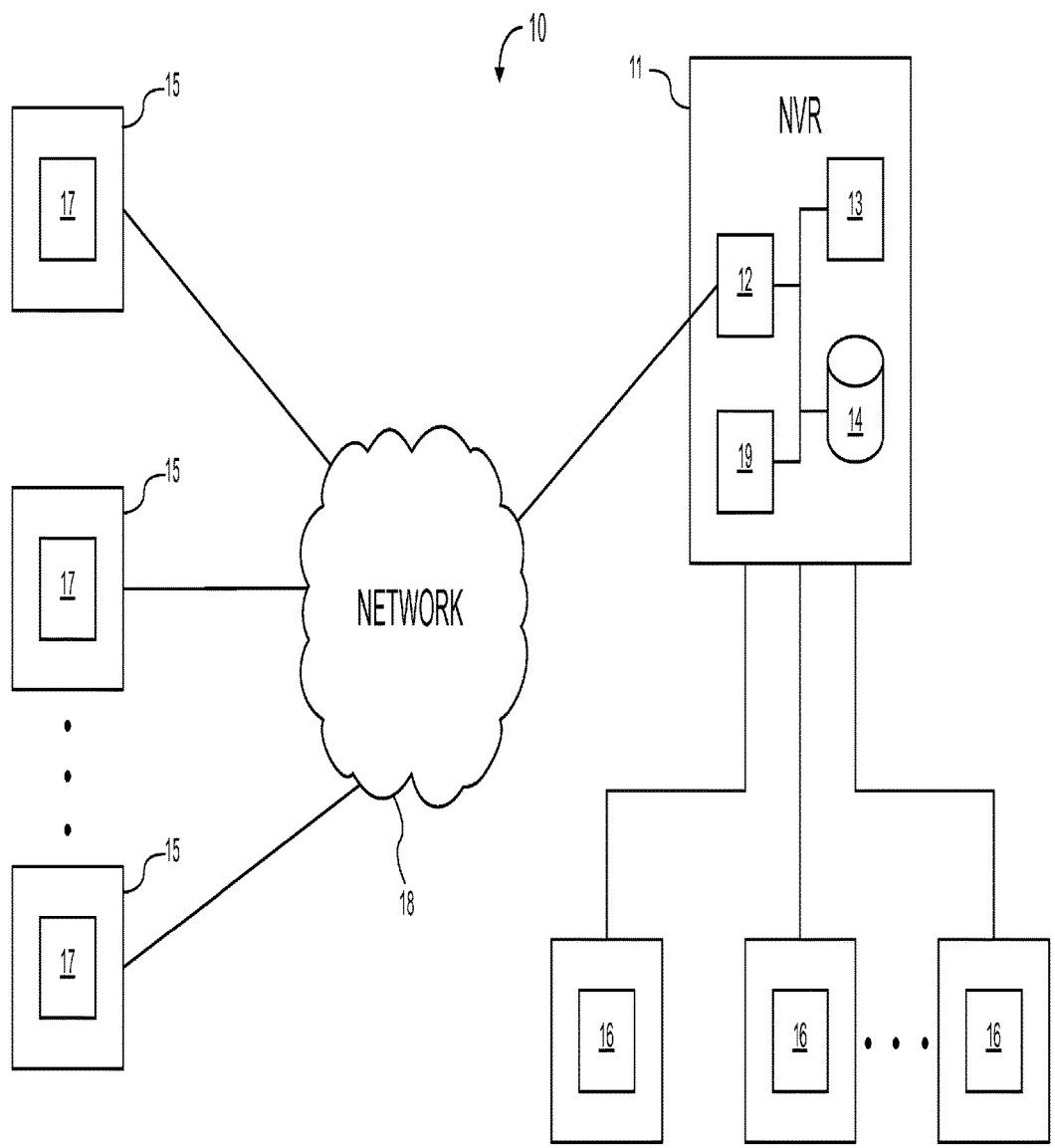
FIG. 1 is a block diagram of an embodiment of a self-healing surveillance network in accordance with the present disclosure.

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions.

Additionally, embodiments of the present disclosure may be described herein in terms of functional block components, code listings, optional selections, page displays, and various processing steps. It should be appreciated that such functional blocks may be realized by any number of hardware and/or software components configured to perform the specified functions. For example, embodiments of the present disclosure may employ various integrated circuit components, e.g., memory elements, processing elements, logic elements, look-up tables, and the like, which may carry out a variety of functions under the control of one or more microprocessors or other control devices.

Similarly, the software elements of embodiments of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, linux, and/or Android®.

Further, it should be noted that embodiments of the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of embodiments of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, embodiments of the present disclosure may be embodied as a method, a data processing system, a device for data processing, and/or a computer program product. Accordingly, embodiments of the present disclosure may take the form of an entirely software embodiment, an entirely hardware embodiment, or an embodiment combining aspects of both software and hardware. Furthermore, embodiments of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

Embodiments of the present disclosure are described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of ways of performing the specified functions, combinations of steps for performing the specified functions, and program instruction ways of performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of embodiments of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, steps recited in any method claims may be executed in any order and are not limited to the order presented in the claims. Moreover, no element is essential to the practice of the disclosure unless specifically described herein as "critical" or "essential."

With respect to FIG. 1, an embodiment of a self-healing surveillance system 10 in accordance with the present disclosure is shown. The disclosed system 10 includes a network video recorder 11 in operable communication with one or more digital video cameras 15 via a network 18. In some embodiments, network 18 may be configured as a TCP/IP network having wired (e.g., Ethernet) and/or wireless (e.g., 802.11 WiFi) network links. The digital video camera(s) 15 may transmit video in any suitable format, such as without limitation, MPEG4 and/or H.264 formatted video. Surveillance system 10 may optionally include one or more analog video cameras 16 that are operably coupled to network video recorder 11, typically by hard-wired link, however in some embodiments wireless analog video links are also supported.

The digital video camera(s) 15 include(s) a configuration storage unit 17. Configuration storage unit 17 may include a memory or data partition that is configured to store configuration data, and may include non-volatile memory which retains data when power is interrupted. Configuration storage unit 17 may additionally include a software program that executes a method of receiving, storing, and transmitting configuration data as described herein. Configuration storage unit 17 may include a unique identifier, which may be an identifier associated with digital video camera 15, or a unique identifier distinct from an identifier associated with digital video camera 15, such that the video functions of digital video camera 15 may be, but need not be, related to the configuration storage functions of configuration storage unit 17. For example, configuration storage unit 17 may assume a different network (e.g., IP) address from that assigned to the video functions of digital video camera 15. In some embodiments, configuration storage unit 17 may remain inactive, partially active, and/or inaccessible unless and until an unlock code is received by configuration storage unit 17 and/or digital video camera 15. In this manner, the configuration storage functions of configuration storage unit 17 may be accessed only by duly authorized users, certified network video recorders 11, software programs, licensees, and the like. Configuration storage unit 17 may include additional processing components, such as a encryption and decryption component, an XML parsing component, and an authentication component.

Network video recorder 11 includes, in operable communication, a configuration management unit 12, configuration data repository 13, a storage unit 14, and a processor 19. Configuration data repository 13 contains the configuration data necessary for proper operation of network video recorder 11, as discussed above. During initialization (booting) of network video recorder 11, configuration management unit 12 examines configuration data 13 to determine whether configuration data repository 13 contains null or default values, which indicates that network video recorder 11 is potentially being booted for the first time in a new environment. If this is the case, configuration management unit 12 will attempt to identify, and connect to, any configuration storage units 17 of digital video cameras 15 that are operational on the network 18. If a connection is successful, configuration management unit 12 will determine whether the connected configuration storage unit 17 contains stored configuration data. If so, configuration management unit 12 downloads the stored configuration data from the connected configuration storage unit 17.

If no configuration storage units 17 are identified, or are not found to contain any configuration data, then the installer is prompted to enter configuration data manually and/or download configuration data from an alternative backup source (e.g., USB stick, disk, or via FTP or other network resource).

In some embodiments, configuration management unit 12 validates the downloaded data to confirm that the data is complete and correct. If necessary, configuration management unit 12 may attempt additional connections to other configuration storage units 17 of digital video cameras 15 until a complete and correct set of configuration data has been downloaded. Once a valid set of configuration data is obtained, configuration management unit 12 writes the downloaded data to configuration data repository 13. Network video recorder 11 may then utilize the restored configuration data repository 13 to continue normal operation.

During normal operation, configuration management unit 12 stores, typically on a periodic basis, configuration data from the configuration data repository 13 in the configuration storage units 17 of the digital video camera(s) 15. In some embodiments, the configuration management unit 12 stores configuration data on a daily basis. Configuration management unit 12 may be configured to detect any change to the configuration data repository 13 and, in response, store updated configuration data from the configuration data repository 13 in the configuration storage units 17 of the digital video camera(s) 15. For example, and without limitation, if an installer adds a user, defines a trigger, or changes a camera setting, and as these changes are committed to the configuration data repository 13, the configuration management unit 12 will detect the change and write the updated configuration data to one or more configuration storage units 17. In this manner, a current copy of configuration data is always available to automatically re-configure a new server whenever the need arises.

In some embodiments, where the digital video camera(s) 15 includes the ability to store video, the video stored while a network video recorder 11 is offline is transmitted to a network video recorder 11 when network video recorder 11 again becomes available, e.g., after redeployment and reconfiguration. The digital video camera(s) 15 may include the ability to transmit live video concurrently with transmitting stored video to network video recorder 11.

Figure 2:
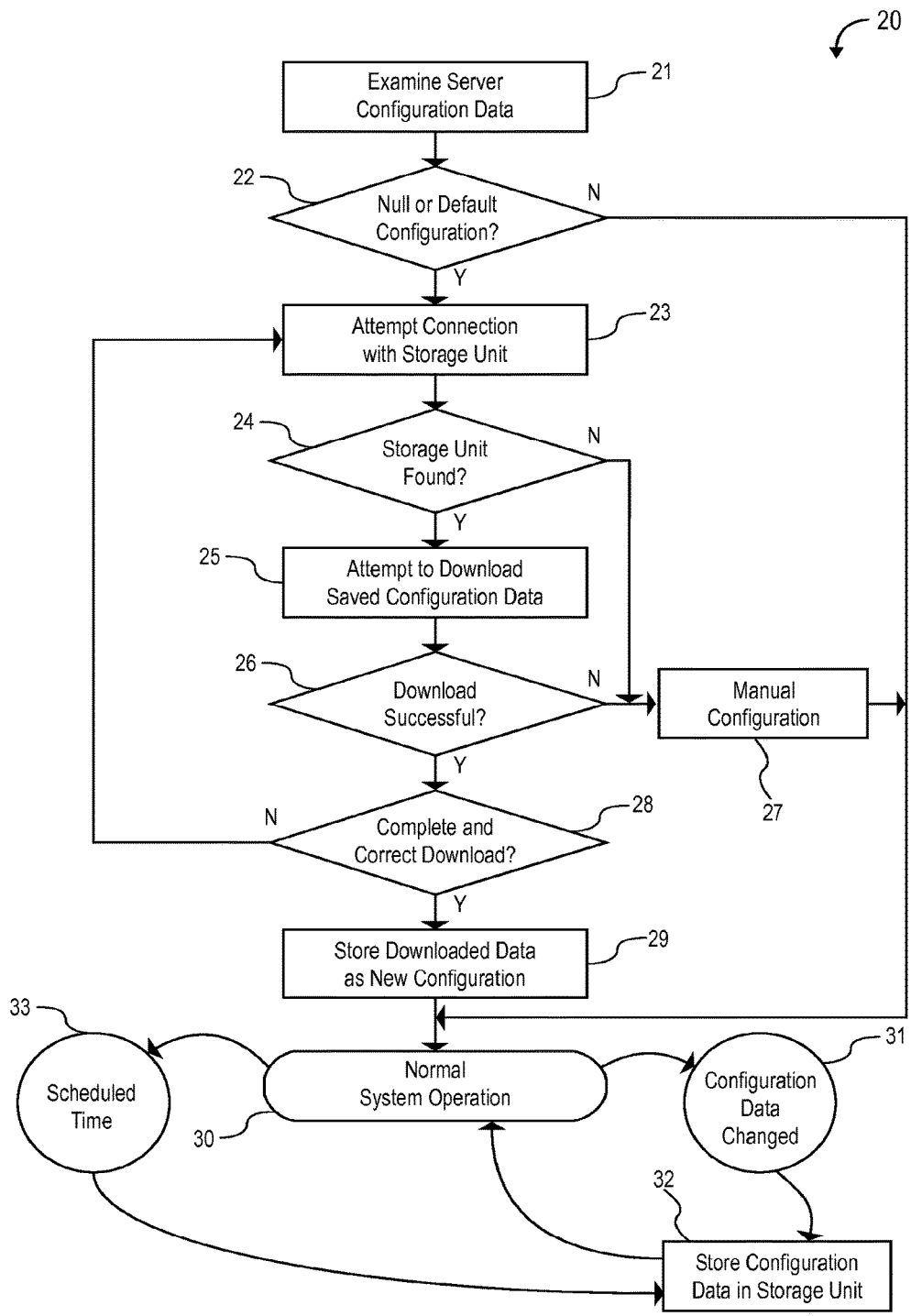
FIG. 2 is a process flow diagram of an embodiment of a method of configuring a server in accordance with the present disclosure.

Turning now to FIG. 2, an embodiment of a method 20 of configuring a server in accordance with the present disclosure is shown. During initialization of the server (e.g., at boot time), in step 21 the server configuration data is examined. If, in step 22 it is determined that the server is configured, the server proceeds with normal operation (step 30). If, however, in step 22 it is determined the server is not configured, e.g., the server configuration data consists of null or default values, then in step 23 an attempt is made to connect with a storage unit (e.g., a remote digital video camera). If in step 24 it is determined a storage unit cannot be found, then processing proceeds with step 27 in which the system is manually configured. If a storage unit is found, then in step 25 an attempt is made to download saved configuration data from the storage unit. If the download is unsuccessful, or no saved configuration data is available, then manual configuration is performed (step 27).

If the saved configuration data is successfully downloaded from the storage unit, then in step 28 the downloaded data is validated to determine that a complete and correct set of configuration data has been obtained. If so, in step 29 the downloaded configuration data is written to the server's configuration data repository (e.g., registry settings, init files, and so forth) and the server proceeds with normal operation (step 30).

If, however, in step 29 the downloaded data is determined to be incomplete and/or incorrect, the process iterates to step 23 and an attempt is made to connect to another storage unit, and repeats until a complete and correct set of configuration data is obtained, or until all available storage units have been queried.

Optionally, if only an incomplete set of configuration data is obtained, but is otherwise correct, then the obtained configuration data is written to the server's configuration data repository, and the missing portions are entered using manual configuration.

During normal system operation (step 30), in the event the server configuration data is changed (step 31), or, a scheduled time arrives (step 33), then in step 32 the current server configuration data is stored in one or more storage units.

Figure 3:
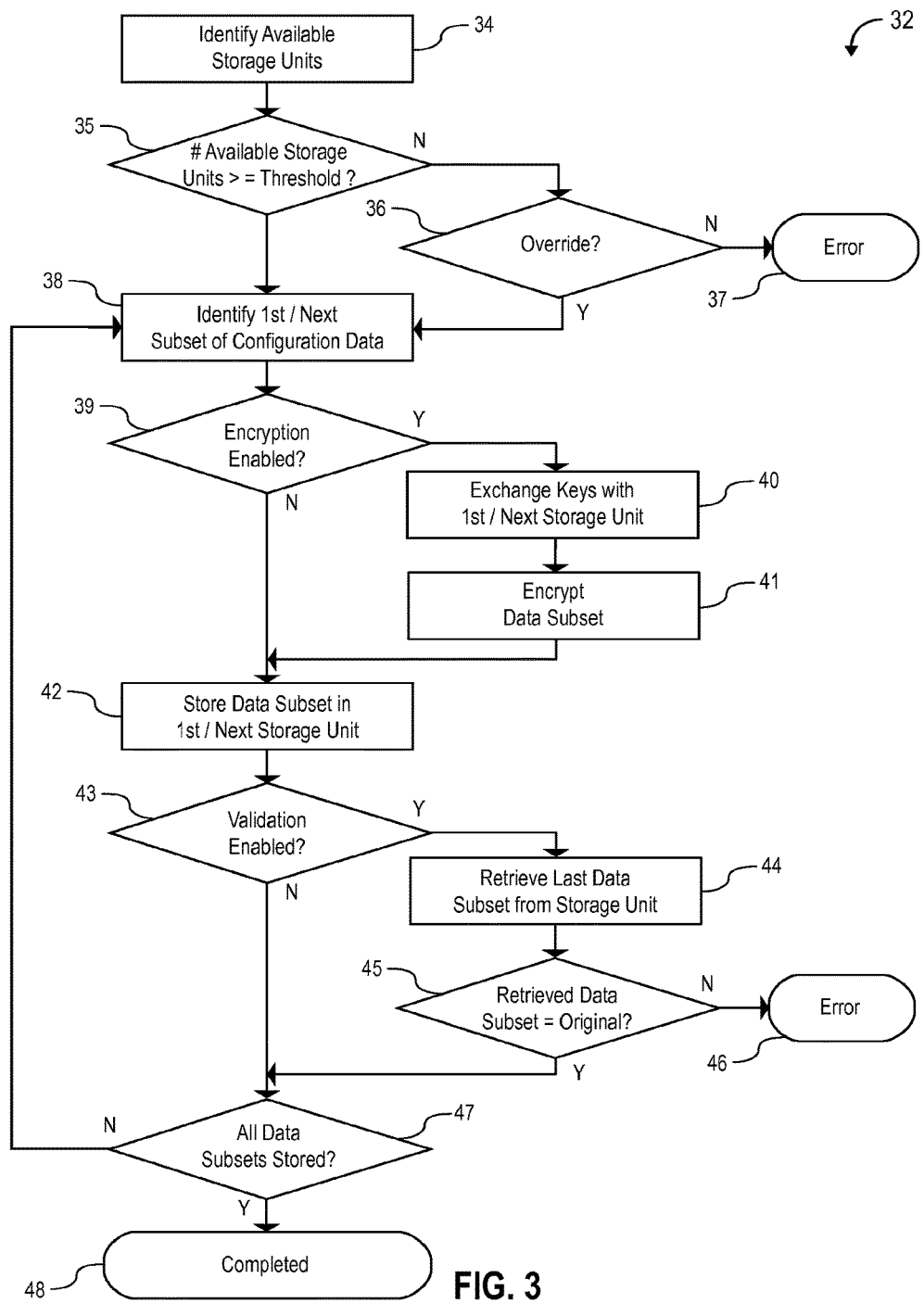
FIG. 3 is a process flow diagram of an embodiment of a method of storing configuration data on a remote device in accordance with the present disclosure.

Turning now to FIG. 3, the method of storing current configuration data of a server on a remote storage unit of step 32 is described in more detail. In step 34, the available storage units (e.g., IP cameras) which are accessible on the network 18 are identified. In step 35, the number of available storage units is compared to a predetermined minimum number of available storage units. For example, the predetermined minimum number may be chosen by a system administrator, may be defined by software licensing or use policy, or may be defined in any other suitable manner. In some embodiments, the predetermined minimum number of units may be one, meaning that storing the entirety of the configuration data set on a single remote storage unit is permissible. In embodiments, the predetermined minimum number of units may be greater than one, which is appropriate when it is desired to distribute the backed up configuration data among several remote storage units to prevent the theft or compromise of any single remote storage unit from yielding the entire configuration data set.

If, in step 35, an insufficient number of storage units are identified, then in step 36 an override request may be issued to a user (e.g., system administrator) who is asked whether to proceed with whatever number of storage units are available. If the override request is declined, then in step 37 an error is flagged. In some embodiments, the user may be asked to modify the predetermined minimum number of available storage units in accordance with the actual number of available storage units in order to facilitate the success of a subsequent storage attempt.

If, in step 35, a sufficient number of storage units are identified or in step 36 an override request is granted, then in step 38 a first subset (or upon successive iterations, a next subset) of configuration data is identified for remote storage on the corresponding first (or next) remote storage device. In embodiments where the predetermined minimum number of units is equal to one, then the subset represents the full set of configuration data. A subset of configuration data may be selected in any number of alternative ways, for example, a subset may represent a contiguous segment of configuration data, interleaved portions of configuration data (e.g., where the number of remote devices is three, every third byte), randomly-selected portions, and so forth.

In embodiments, identification data is appended, or otherwise annexed to, each data subset. Identification data includes, without limitation, a source identifier (e.g., the server to which the configuration data belongs), a timestamp, a subset identifier (for example, "subset 3 of 6"), an encryption key, a checksum, and/or other data which may facilitate the reconstruction of subsets into original form. In some embodiments, the configuration data and/or subsets thereof may be stored in eXtensible Markup Language (XML).

In step 39, a determination is made whether the configuration data is to be transmitted and/or stored in an encrypted format. If so, then in step 40 encryption keys are exchanged between the server and the current remote storage device and in step 41, the configuration data subset is encrypted in accordance with the exchanged keys and desired cryptographic algorithm (e.g., DES, SHA1, RSA, AES, DESX, RC4, MD5-RSA, SHA1-DSA, etc.). In step 41 the data subset is transmitted to and stored in the first/next storage device. In step 43, a determination is made whether to validate the just-stored data (e.g., in accordance with a validation user-preference setting). If so, the just-stored data subset is retrieved from the corresponding remote storage unit, decrypted if necessary, and compared to the original subset. If the retrieved data does not match the original, then in step 46 an error is flagged. In embodiments, a failed validation causes a retry attempt to be made wherein the subset is stored again on the corresponding remote storage device. In embodiments, a different remote storage device may be used to store the subset.

If, however, in step 43 it is determined that no validation is to be performed, or, validation was successful in step 45, then in step 47 a determination is made whether all data subsets have been stored. If one or more subsets remain, then the process iterates with step 38 wherein the next subset is identified for storage. If all data subsets have been stored, then processing concludes with step 48.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law.

What is claimed is:

1. A method for storing configuration data, comprising:
   determining a number of available remote storage units, which are available by way of a communication network, wherein the remote storage units include at least one surveillance camera;
   comparing the number of available remote storage units to a predefined number of remote storage units; and
   based on a result of the comparing, storing, in at least one of the available remote storage units, configuration data related to a network video recorder.

2. The method of claim 1, wherein the storing of the configuration data includes storing the configuration data in response to a change in the configuration data.

3. The method of claim 1, wherein the storing of the configuration data includes storing the configuration data according to a predetermined schedule.

4. The method of claim 1, further comprising, in a case where it is determined that the number of available remote storage units is less than the predefined number of remote storage units, generating an override request.

5. The method of claim 4, further comprising:
   in a case where the override request is granted, storing the configuration data in at least one of the available remote storage units, and
   in a case where the override request is denied, generating an error notice.

6. The method of claim 5, further comprising, in a case where the override request is granted, modifying the predefined number of remote storage units to match the number of available remote storage units.

7. The method of claim 1, further comprising, in a case where it is determined that a plurality of remote storage units are available and the configuration data comprises a plurality of subsets of configuration data, storing the plurality of subsets of configuration data in the plurality of available remote storage units, respectively.

8. The method of claim 7, further comprising modifying each of the subsets of configuration data to include identification data that enables reconstruction of the configuration data.

9. The method of claim 1, further comprising:
   determining whether encryption is enabled; and
   in a case where it is determined that encryption is enabled, exchanging at least one encryption key between the network video recorder and at least one of the remote storage units.

10. The method of claim 1, further comprising validating the storing of the configuration data in the at least one of the remote storage units.

11. A system for storing configuration data, comprising:
    a processor; and
    a memory coupled to the processor and having instructions stored thereon that, when executed by the processor, cause the processor to:
    determine a number of available remote storage units, which are available by way of a communication network, wherein the remote storage units include at least one surveillance camera,
    compare the number of available remote storage units to a predefined number of remote storage units; and
    based on a result of the comparing, store, in at least one of the available remote storage units, configuration data related to a network video recorder.

12. The system of claim 11, wherein the memory has further instructions stored thereon that, when executed by the processor, cause the processor to store the configuration data in response to a change in the configuration data.

13. The system of claim 11, wherein the memory has further instructions stored thereon that, when executed by the processor, cause the processor to store the configuration data according to a predetermined schedule.

14. The system of claim 11, wherein the memory has further instructions stored thereon that, when executed by the processor, cause the processor to, in a case where it is determined that the number of available remote storage units is less than the predefined number of remote storage units, generate an override request.

15. The system of claim 14, wherein the memory has further instructions stored thereon that, when executed by the processor, cause the processor to:
   in a case where the override request is granted, store the configuration data in at least one of the available remote storage units, and
   in a case where the override request is denied, generate an error notice.

16. The system of claim 15, wherein the memory has further instructions stored thereon that, when executed by the processor, cause the processor to, in a case where the override request is granted, modify the predefined number of remote storage units to match the number of available remote storage units.

17. The system of claim 11, wherein, in a case where it is determined that a plurality of remote storage units are available and the configuration data comprises a plurality of subsets of configuration data, the memory has further instructions stored thereon that, when executed by the processor, cause the processor to store the plurality of subsets of configuration data in the plurality of available remote storage units, respectively.

18. The system of claim 17, wherein the memory has further instructions stored thereon that, when executed by the processor, cause the processor to modify each of the subsets of configuration data to include identification data that enables reconstruction of the configuration data.

19. The system of claim 11, wherein the memory has further instructions stored thereon that, when executed by the processor, cause the processor to:
   determine whether encryption is enabled; and
   in a case where it is determined that encryption is enabled, exchange at least one encryption key between the network video recorder and at least one of the remote storage units.

20. A non-transitory computer-readable medium having stored thereon instructions that, when executed by a computer, cause the computer to execute a method for storing configuration data, the method comprising:
   determining a number of available remote storage units, which are available by way of a communication network, wherein the remote storage units include at least one surveillance camera;
   comparing the number of available remote storage units to a predefined number of remote storage units; and
   based on a result of the comparing, storing, in at least one of the available remote storage units, configuration data related to a network video recorder.

* * * * *